No. 710,135. Patented Sept. 30, 1902.
J. C. BLAKE.
RUBBER TIRE SETTING MACHINE.
(Application filed Aug. 29, 1901.)

(No Model.) 2 Sheets—Sheet 1.

Witnesses:
Maude Grieser
M. W. Wade

Inventor:
John C. Blake,
By Humphrey & Humphrey,
Attorneys.

THE NORRIS PETERS CO., PHOTO-LITHO., WASHINGTON, D. C.

No. 710,135. Patented Sept. 30, 1902.
J. C. BLAKE.
RUBBER TIRE SETTING MACHINE.
(Application filed Aug. 29, 1901.)

(No Model.) 2 Sheets—Sheet 2.

Witnesses:
Maude Grisler.
M. W. Wade.

Inventor:
John C. Blake,
by Humphrey & Humphrey,
Attorneys.

UNITED STATES PATENT OFFICE.

JOHN C. BLAKE, OF TOLEDO, OHIO, ASSIGNOR TO THE INDIANA RUBBER AND INSULATED WIRE COMPANY, OF JONESBORO, INDIANA.

RUBBER-TIRE-SETTING MACHINE.

SPECIFICATION forming part of Letters Patent No. 710,135, dated September 30, 1902.

Application filed August 29, 1901. Serial No. 73,710. (No model.)

*To all whom it may concern:*

Be it known that I, JOHN C. BLAKE, a citizen of the United States, residing at 1203 Madison street, Toledo, in the county of Lucas and State of Ohio, have invented a certain new and useful Improvement in Rubber-Tire-Setting Machines, of which the following is a specification.

My invention has relation to improvements in machines for placing in metallic tires having a channel in their peripheries, the sides of which are turned inward, solid rubber tires having a flat base and a rounded periphery in section and have laterally-extending ridges or fillets at each side of the base to fit the lateral grooves of the metal tire formed by the inturned sides and that require to be compressed to enter the channeled tire, but when so entered are held by the inturned edges of the metal tire bearing on the lateral flanges or fillets.

The object of my invention is to provide a simple and easily-operated machine which shall afford proper compression and force to place the rubber tire in the metal tire.

To the aforesaid object my invention consists in the peculiar and novel construction, arrangement, and combination of parts hereinafter described and then specifically pointed out in the claims, reference being had to the accompanying drawings, which form a part of this specification.

Figure 1:
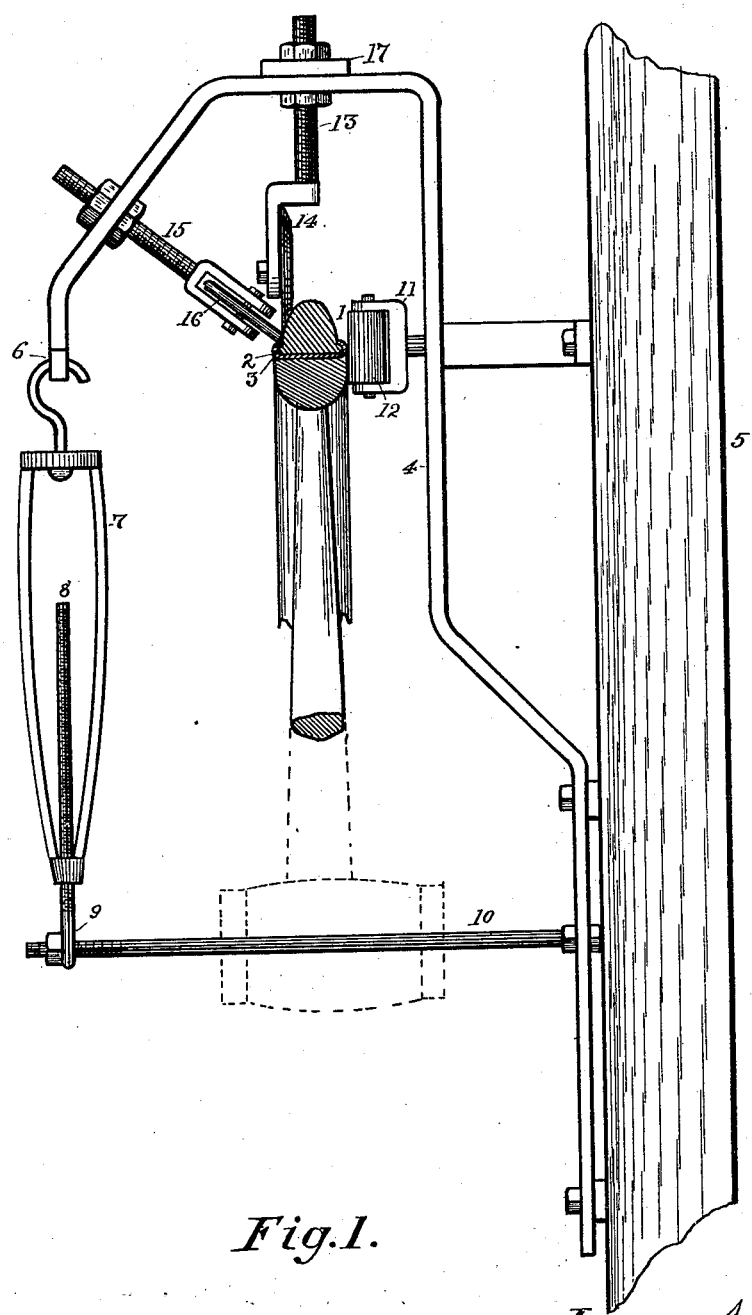
Figure 2:
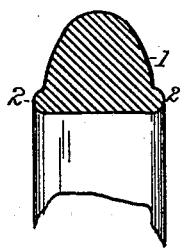
Figure 3:
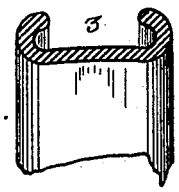
Figure 4:
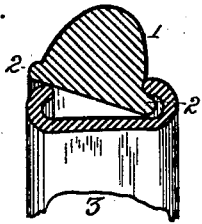

In the accompanying drawings, in which similar reference-numerals indicate like parts in the different figures, Figure 1 is an elevation of my improved machine with the wheel-felly and metal and rubber tire in section; Fig. 2, a section of the rubber tire; Fig. 3, a section of the metal tire; Fig. 4, a section of the metal and rubber tires, illustrating the first position of introducing the latter into the former; and Fig. 5, a section showing the rubber tire seated in the metal tire.

Referring to the figures, 1 is the rubber tire, which has a flat base and a rounded tread portion, with lateral rounded ridges or fillets 2 extending from each side of the base.

The metal tire 3 consists of a flat metal bar with the edges curved upward and inward, forming lateral grooves or channels adapted to receive and snugly fit the ridges 2 of the rubber tire. The machine for placing these rubber tires in the metal tires consists, primarily, of a metallic bar 4, having one end secured to a post 5 or other convenient support and constituting the housing of the machine. This bar 4 is bent outward diagonally above its upper point of attachment to the post 5 and thence vertically for a sufficient distance to afford space for the operating mechanism, whence it is bent to a horizontal position far enough to admit said mechanism and thence inclined downward diagonally for a short distance, whence it descends vertically, terminating in an eye 6. Supported in the eye 6 is a turnbuckle 7, bearing at its lower end a nut, in which runs a screw 8, terminating in a loop 9. The portion of the bar 4 that stands vertically close to the post 5 is vertically slotted to receive the end of an axle-bar 10, adjustably secured therein by binding-nuts on each side, the other end of which bar is sustained by the loop 9 of the screw 8 and is thus vertically adjustable. Revolubly mounted in a fork 11, secured in the offset vertical part of the bar 4, is a vertical roller 12, adapted to rest against the felly and metal tire of the wheel to be fitted and form an abutment for the tire-placing wheels hereinafter described. In the upper diagonal part of the bar 4 is an adjustable screw 15, bearing at its lower end a fork in which is revolubly mounted a narrow roller 16, with a curved or sharp periphery, as desired, and arranged to bear against the side of the rubber tire directly opposite the roller 12. Adjustably secured on the horizontal part of the bar 4 is a bracket 17, through which passes vertically a screw 13, capable of being rotated to secure vertical adjustment, and when so placed it is secured there by lock-nuts. The lower portion of this screw 13 bears a half-fork to which is attached a plano-convex roller 14, adapted when placed correctly to bear upon the rounded edge or fillet of the tire 1 and force it downward into place after the roller 16 has compressed it laterally, and this roller 14 travels immediately behind the roller 16, but very close to it, so that during the compression produced by the roller 16 the force of the roller 14 will press the fillet 2 of the tire into the iron tire 3.

Figure 5:
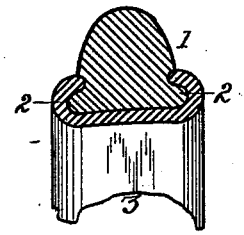

In operation the wheel is mounted on the bar 10, which is vertically adjusted so as to bring the felly and metal tire in position to bear on the roller 12. The end of the rubber tire 1 is then placed in the channel of the metal tire, with the fillet 2 nearest the post 5 resting in the groove of the metal tire on that side, as illustrated in Fig. 4, and back of the rollers just described. The wheel is then slowly revolved forward by hand, the loose portion of the tire being supported and guided by hand, bringing the tire first in contact with the roller 16, which compresses it inward sufficiently to permit the fillet 2 of that side to enter the metal tire. While the rubber is thus compressed as the wheel is revolved it passes under the roller 14, which presses it into the metal tire, and as it advances beyond these rollers it expands by its resiliency and forces the front fillet 2 into its groove in the metal tire, thus effectually seating the rubber in the metal tire, as indicated in Fig. 5. The ends of the rubber tire are arranged to abut each other when the tire is in place and are united by cement, when the completed wheel is removed.

I claim as my invention—

1. An improved machine for placing rubber tires having fillets on opposite sides of the base, in metal tires having opposite grooves to receive and fit said fillets, which consists of means for revolubly supporting the wheel, a plano-convex roller to bear against the side of the rubber tire, and an adjacent narrow-edged roller to bear diagonally against the tire above the fillet, substantially as shown and described.

2. An improved machine for placing rubber tires having fillets on opposite sides of the base, in metal tires having opposite grooves to receive and fit said fillets, which consists of means for revolubly supporting the wheel, a plano-convex roller to bear against the side of the rubber tire, an adjacent narrow-edged roller to bear diagonally against the tire above the fillet, and an abutment-roller to bear against the metallic tire, substantially opposite the other rollers, substantially as shown and described.

3. An improved machine for placing rubber tires having fillets on opposite sides of the base, in metal tires having opposite grooves, which consists of a housing bearing an abutment-roller to support the wheel against side thrust, a plano-convex roller to bear against the side of the tire opposite said abutment-roller, an adjacent narrow-edged roller to bear diagonally against the tire above the fillet, said plano-convex and narrow-edged rollers being adjustable in said housing and adjustable means for supporting the wheel, substantially as shown and described.

In testimony that I claim the above I hereunto set my hand in the presence of two subscribing witnesses.

JOHN C. BLAKE.

In presence of—
R. E. LUCAS,
A. F. SEIBERLING.